United States Patent
Nölscher et al.

(10) Patent No.: US 10,911,949 B2
(45) Date of Patent: Feb. 2, 2021

(54) SYSTEMS AND METHODS FOR A VEHICLE AUTHENTICATING AND ENROLLING A WIRELESS DEVICE

(71) Applicant: Byton Limited, Hong Kong (HK)

(72) Inventors: Henrik Ferdinand Nölscher, Ulm (DE); Francisco Javier Vazquez Vidal, Ulm (DE)

(73) Assignee: Byton Limited, Hong Kong (HK)

( * ) Notice: Subject to any disclaimer, the term of this patent is extended or adjusted under 35 U.S.C. 154(b) by 155 days.

(21) Appl. No.: 16/042,847

(22) Filed: Jul. 23, 2018

(65) Prior Publication Data

US 2020/0029213 A1    Jan. 23, 2020

(51) Int. Cl.
*H04L 29/00* (2006.01)
*H04W 12/06* (2009.01)
(Continued)

(52) U.S. Cl.
CPC ........... *H04W 12/06* (2013.01); *H04L 9/3226* (2013.01); *H04L 9/3234* (2013.01);
(Continued)

(58) Field of Classification Search
CPC .... H04W 12/06; H04W 12/08; H04L 9/3226; H04L 63/0435; H04L 9/3271;
(Continued)

(56) References Cited

U.S. PATENT DOCUMENTS 5,878,340 A * 3/1999 Asaoka ............. H04W 12/0608
455/432.1
8,736,438 B1 * 5/2014 Vasquez .................. B60R 25/24
340/539.11
(Continued)

FOREIGN PATENT DOCUMENTS

| CN | 103178966 A | 6/2013 |
|---|---|---|
| CN | 104412537 A | 3/2015 |
| CN | 107914665 A | 4/2018 |

OTHER PUBLICATIONS

Sorokanich, Bob. "Hackers Crack Key-Fob Encryption Used by More Than 25 Automakers." Hackers Crack Key Fob Encryption Used by 26 Automakers—News—Car and Driver, Hearst Communications, Aug. 2015, May 30, 2018, www.caranddriver.com/news/hackers-crack-key-fob-encryption-used-by-more-than-25-automakers.

(Continued)

*Primary Examiner* — Don G Zhao

(74) *Attorney, Agent, or Firm* — Womble Bond Dickinson (US) LLP

(57) ABSTRACT

Disclosed is a method and apparatus for authentication of a first wireless device by a vehicle. The method may include generating a wireless message that comprises an identifier of the vehicle, wherein the wireless message is encrypted with an encryption key of the vehicle. The method may also include receiving a wireless message response that comprise the identifier of the vehicle and an identifier of the first wireless device, wherein the wireless message response from to the first wireless device is encrypted with the encryption key of the vehicle. Furthermore, the method may include decrypting the wireless message response from the first wireless device and performing an authentication process to authenticate the first wireless device to the vehicle when the identifier of the first wireless device in the wireless message response matches an identifier of a wireless device enrolled with the vehicle.

23 Claims, 4 Drawing Sheets

(51) Int. Cl.
  *H04L 9/32* (2006.01)
  *H04L 29/06* (2006.01)
  *H04W 12/08* (2009.01)
(52) U.S. Cl.
  CPC .......... *H04L 9/3271* (2013.01); *H04L 9/3297* (2013.01); *H04L 63/0435* (2013.01); *H04W 12/08* (2013.01); *H04L 2209/80* (2013.01); *H04L 2209/84* (2013.01)
(58) Field of Classification Search
  CPC . H04L 9/3234; H04L 9/3297; H04L 2209/84; H04L 2209/80
  See application file for complete search history.

(56) References Cited

U.S. PATENT DOCUMENTS

| | | | | |
|---|---|---|---|---|
| 8,781,442 | B1* | 7/2014 | Link, II | G08G 1/205 455/411 |
| 9,031,237 | B2 | 5/2015 | Alrabady et al. | |
| 9,767,689 | B1* | 9/2017 | Cain | G08G 1/0141 |
| 10,032,319 | B2* | 7/2018 | Ricci | G06Q 30/0625 |
| 10,127,378 | B2* | 11/2018 | Toth | G06F 21/45 |
| 10,493,953 | B2* | 12/2019 | Arakawa | G07C 9/00309 |
| 2006/0186993 | A1* | 8/2006 | Inoue | B60R 25/245 340/5.72 |
| 2009/0265100 | A1* | 10/2009 | Murakami | H04M 1/6091 701/36 |
| 2012/0095642 | A1* | 4/2012 | Nishida | H04L 12/28 701/31.4 |
| 2013/0274955 | A1* | 10/2013 | Rosenbaum | G07C 5/008 701/1 |
| 2014/0037092 | A1* | 2/2014 | Bhattacharya | H04L 9/0891 380/259 |
| 2014/0143839 | A1* | 5/2014 | Ricci | G06F 21/602 726/4 |
| 2015/0295920 | A1* | 10/2015 | Van Kerrebroeck | G06Q 20/3229 726/9 |
| 2016/0012653 | A1* | 1/2016 | Soroko | G07C 5/0808 340/5.61 |
| 2016/0134599 | A1* | 5/2016 | Ross | H04W 12/0609 713/168 |
| 2016/0295414 | A1* | 10/2016 | Giraud | H04W 12/06 |
| 2016/0323741 | A1* | 11/2016 | Lee | H04L 63/123 |
| 2016/0344705 | A1* | 11/2016 | Stumpf | H04L 67/12 |
| 2016/0373261 | A1* | 12/2016 | Tschache | H04L 12/40104 |
| 2017/0012774 | A1* | 1/2017 | Antoni | H04L 63/123 |
| 2017/0034867 | A1* | 2/2017 | Oshida | H04W 12/10 |
| 2017/0092027 | A1* | 3/2017 | Sasaki | G06Q 10/1093 |
| 2017/0142589 | A1* | 5/2017 | Park | H04W 12/06 |
| 2017/0272418 | A1* | 9/2017 | Kim | H04L 67/12 |
| 2018/0009446 | A1* | 1/2018 | Ricci | G08G 1/0962 |
| 2018/0012426 | A1* | 1/2018 | Ricci | B60L 53/14 |
| 2018/0012427 | A1* | 1/2018 | Ricci | G07C 9/00563 |
| 2019/0028267 | A1* | 1/2019 | Takemori | H04L 9/088 |
| 2019/0087554 | A1* | 3/2019 | Fish | H04B 1/3888 |
| 2019/0106317 | A1* | 4/2019 | Sahota | G06Q 30/06 |
| 2019/0109855 | A1* | 4/2019 | Takeuchi | H04W 12/04 |
| 2019/0121535 | A1* | 4/2019 | Tamane | G07C 9/00896 |
| 2019/0143940 | A1* | 5/2019 | Inami | H04L 9/3271 340/5.61 |
| 2019/0143941 | A1* | 5/2019 | Inami | H04L 9/0819 340/5.28 |
| 2019/0188817 | A1* | 6/2019 | Yanagida | G06Q 10/06311 |
| 2019/0197221 | A1* | 6/2019 | Okada | G06F 21/32 |
| 2019/0279440 | A1* | 9/2019 | Ricci | H04W 4/48 |
| 2019/0334884 | A1* | 10/2019 | Ross | H04L 63/0442 |

OTHER PUBLICATIONS

Bird, Colin. "Keyless-Entry Cars Vulnerable to Silent Theft." Keyless-Entry Cars Vulnerable to Silent Theft / News / Cars.com, Cars.com, Jan. 17, 2011, May 30, 2018, www.cars.com/articles/2011/01/keyless-entry-cars-vulnerable-to-silent-theft/.

Glocker, Tobias, et al. A Protocol for a Secure Remote Keyless Entry System Applicable in Vehicles Using Symmetric-Key Cryptography. Dec. 3, 2016.

Security, Andy Greenberg. "This Hacker's Tiny Device Unlocks Cars and Opens Garages." This Hacker's Tiny Device Unlocks Cars and Opens Garages / Wired, Wired, Aug. 6, 2015, May 30, 2018, www.wired.com/2015/08/hackers-tiny-device-unlocks-cars-opens-garages/.

The International Search Report and Written Opinion of the International Searching Authority for PCT Application No. PCT/CN2019/097363 dated Oct. 24, 2019, 8 pages.

* cited by examiner

SYSTEMS AND METHODS FOR A VEHICLE AUTHENTICATING AND ENROLLING A WIRELESS DEVICE

FIELD

The disclosed embodiments relate generally to vehicle systems and in particular, but not exclusively, to enabling secure authentication and enrollment of a wireless device by a vehicle.

BACKGROUND

Vehicles, such as cars, trucks, trains, etc., generally include a lock to prevent unauthorized access to the vehicle, as well as to prevent the unauthorized starting and operation of the vehicle. While such locks used to involve physical keys, more and more vehicles are using wireless entry and ignition systems. With wireless entry and ignition systems, a hardware device referred to as a key fob provides authentication data to the vehicle. When verified by the vehicle, the user is electronically granted access to the vehicle and/or the ability to start and operate the vehicle. Typically, the key fob and the vehicle continue to exchange wireless authentication data, or other signaling, so that they vehicle can ensure that the key fob, and thus the operator, are still in proximity to the vehicle during operation.

Key fobs, however, may be lost, stolen, hacked by copying data from a key fobs memory, or spoofed by intercepting data from legitimate communications. When lost or stolen, an unauthorized user may be able to access and operate the vehicle. Similarly, a nefarious user may monitor the data exchanged between the vehicle and the key fob during a legitimate authentication process in order to take advantage of weak or non-existent security safeguards.

For example, a secret key transmitted between a key fob and a vehicle can be intercepted by a nefarious actor. The intercepted key can be programmed into another key fob or radio transmitter, and used to replay the original message to gain access to the vehicle (see, *This Hacker's Tiny Device Unlocks Cars And Opens Garages*, Andy Greenberg, Aug. 6, 2015).

As another example, the captured key may be used to narrow down potential keys for use in a brute force attack to key based encryption systems when gaining unauthorized access to a vehicle (see, *Hackers Crack Key-Fob Encryption Used by More Than 25 Automakers*, Bob Sorokanich, Aug. 20, 2015).

As yet another example, a legitimate message exchange between a key fob and a vehicle, such as a code, rolling code, counter value exchanges, etc. can be captured and/or relayed by a nefarious source using radio receivers and transmitters to gain unauthorized access to a vehicle (see, Keyless-Entry Cars Vulnerable to Silent Theft, Colin Bird, Jan. 17, 2011).

Such scenarios do not secure a user's vehicle from unauthorized access and/or operation. More specifically, existing systems fail to safeguard against remotely located key fob hacking (e.g., radio signal capture and radio based attacks), usage of weak security protocols (e.g., predictable code exchanges that can be replayed and/or reproduced), and usage of weak key exchange techniques (e.g., weak encryption methods vulnerable to brute force attacks).

Furthermore, the key fob and/or the vehicle may exchange wireless messages as part of authenticating the key fob, such as beacons, while the vehicle is being operated. The data exchanged in the beacon messages, however, may be static therefore leading to the vehicle being inadvertently trackable. That is, data exchanged between the vehicle and key fob includes one or more static data elements, and the reception of such a static element (e.g., by other vehicles, wireless network access points, or other signal receivers) enables the location of the vehicle to be determined and tracked by tracking the transmissions of the static data over a period of time. Out of privacy and/or safety concerns, a user may not desire their vehicle to be trackable by unknown and/or untrusted receivers.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
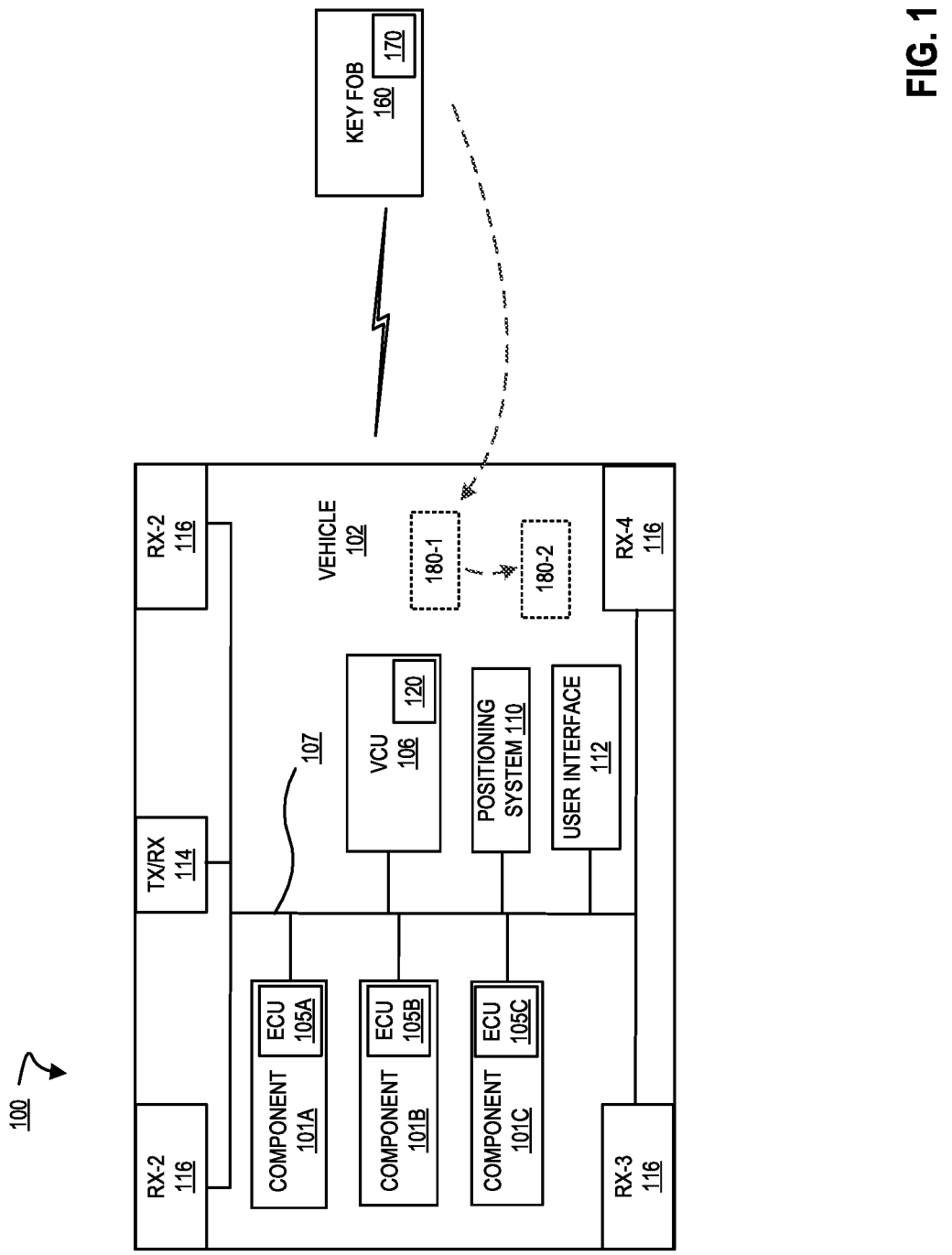
FIG. 1 is a block diagram of an exemplary system architecture for enabling secure authentication and enrollment of a wireless key fob by a vehicle.

FIG. 1 is a block diagram of an exemplary system architecture 100 for enabling secure authentication and enrollment of a wireless key fob by a vehicle. System 100 implements a secure method for authenticating key fob 160 to vehicle 102, and exchanging data to maintain authentication during operation of the vehicle that prevents the vehicle 102 from being tracked using the exchanged data. Furthermore, the key fob 160 may be securely enrolled with vehicle 102 to ensure that only authorized key fobs and optionally authorized users of vehicle 102 are granted access and/or the ability to operate vehicle 102.

In embodiments, vehicle 102 may be a fully electric vehicle, partially electric (i.e., hybrid) vehicles, non-electric vehicles (i.e., vehicle with a traditional internal combustion engine). Furthermore, although described mostly in the context of automobiles, the illustrated systems and methods can also be used in other wheeled vehicles such as trucks, motorcycles, buses, trains, etc. It can also be used in non-wheeled vehicles such as ships, airplanes (powered or gliders), and rockets. In fact, the illustrated embodiments can be used in any situation in which it is useful to provide wireless and secure access using a key fob.

In embodiments, key fob 160 is a hardware device capable of wirelessly transmitting and receiving data, and performing one or more authentication processes, as discussed in greater detail herein. Key fob 160 may be a purpose built device that's primary function is as a wireless key for providing access to, and enabling operation of, vehicle 102. In embodiments, however, key fob 160 may be any wireless device with a transceiver, memory, and processor configured to perform the processes discussed herein. For example, a smartphone, smart watch, wearable device, tablet computer, or other wireless device may be configured to perform the functions of key fob 160.

In one embodiment, vehicle 102 includes one or more systems, such as components 101, each having an electronic control unit (ECU) 105, and each ECU 105 is communicatively coupled via a communications network 107 to a vehicle control unit (VCU) 106. The communications network 107 may be a controller area network (CAN), an Ethernet network, a wireless communications network, another type of communications network, or a combination of different communication networks. VCU 106 is also communicatively coupled to a positioning system 110 (e.g., a satellite navigation system), a user interface 112, a transceiver 114, and a plurality of receivers 116 (e.g., receivers RX-1 through RX-N). Transceiver 114 and receivers 116 are communicatively coupled to antennas (not shown), through which vehicle 102 can wirelessly transmit data to, and receive data from, key fob 160, as well as other systems (e.g., LAN access points, WAN access points, other vehicles, security servers, remote maintenance systems, etc.). In embodiments, transceiver 114 and receivers 116 are capable of transmitting and receiving wireless messages in a personal area network, such as a Bluetooth™, Bluetooth™ low energy (BLE), Zigbee, or other wireless personal area network, consistent with the discussion herein. In the illustrated embodiment, vehicle 102 communicates wirelessly with key fob 160.

Components 101 are generally components of the systems of the vehicle 102. For example, components 101 can include adjustable seat actuators, power inverters, window controls, electronic braking systems, etc. Vehicle control unit (VCU) 106 is a controller including a microprocessor, memory, storage, and a communication interface with which it can communicate with components 101, positioning system 110, user interface 112, transceiver 114, and receivers 116 via network 107. In one embodiment VCU 106 is the vehicle's main computer, but in other embodiments it can be a component separate from the vehicle's main or primary computer.

In one embodiment, VCU 106 includes a vehicle encryption manager 120 that is used for vehicle-side management of the enrollment and authentication of key fob 160 with vehicle 102, as discussed in greater detail below. Similarly, key fob 160 also includes a key fob encryption manager 170 for key fob-side management of the enrollment and authentication of key fob 160 with vehicle, as discussed in greater detail below. The encryption managers 120 and 170 may be software executed by respective processors of vehicle 102 and key fob 160, may be hardware (circuitry, dedicated logic, etc.), firmware, or a combination. Furthermore, as discussed herein, the encryption managers may be configured to execute publicly vetted and secure encryption protocols, such as advanced encryption standard (AES) encryption protocols including AES128 encryption, authenticated encryption protocols, such as CCM mode of AES, GCM mode of AES, etc., as well as other encryption protocols. The usage of such encryption protocols and techniques in the authentication and enrollment described herein ensures that the encryption techniques used are trusted, known to be secure, and provide the ability to safeguard the data that has been encrypted and exchanged wirelessly between the vehicle 102 and key fob 160 (e.g., to prevent against brute force attacks, replay attacks, and avoid known issues with weak encryption techniques). Other encryption protocols may be used by encryption managers 160 and 170 in accordance with the discussion herein, for example, using message authentication code (MAC) tags for encrypted messages to provide message and content authentication, adding nonce data to encrypted messages (e.g., arbitrary random numbers prepended to an encrypted message payload and used only once during cryptographic message exchange to ensure message freshness, to prevent replay attacks, and to serve as an initialization vector or nonce for the encryption process itself), etc.

In embodiments, key fob 160 is initially enrolled with vehicle 102, and vehicle 102 is enrolled with key fob 160. In embodiments, key fob's 160 enrollment may occur, for example, at a dealership, at a service center, or by a user that is enrolling a new key fob for use with vehicle 102. During an enrollment process, as discussed in greater detail below in FIG. 4, communications are exchanged between vehicle 102 and key fob 160. In embodiments, some of the enrollment communications that are exchanged between vehicle 102 and key fob 160 are not encrypted until a symmetric key is exchanged and known to both the vehicle 102 and the key fob 160. However, certain elements of the communications including encryption keys or other private data are encrypted within the messages exchanged during enrollment of key fob 160 with vehicle. As will be discussed in greater detail below, what data is encrypted and what messages are encrypted during the key fob enrollment process ensures that key fob encryption keys and vehicle encryption keys are secured during wireless transmission.

In embodiments, where one or more messages exchanged during the enrollment process are encrypted, the encryption may utilize an encryption key associated with key fob 160. Therefore, at a time prior to enrollment or during enrollment, a request is made by a user (e.g., vehicle owner, vehicle fleet manager, dealership, etc.) seeking to enroll key fob 160 to vehicle 102 for an encryption key that will be associated with the key fob 160 seeking enrollment. The request is made to a secure server operated by or associated with a manufacturer (not shown) of the vehicle 102, to provision a new key fob for use with vehicle 102. In embodiments, such a request will typically include authenticating the requesting user to the secure server in order to verify the user's identity and their authority to enroll a new key fob with vehicle 102 (e.g., verification of a username and password, performing a biometric identification, or a combination of user authentications). Furthermore, certain users, such as factory technician and vehicle service workers, may have a device or system that can form a trusted connection to vehicle 102 for enrollment of a new key fob (e.g., by forming a physical or wireless connection to the vehicle 102 via a diagnostics port, a reserved and/or secure communications channel, etc.). In either embodiment, the request will trigger a process that generates or otherwise exchanges an encryption key for the to-be-enrolled key fob, provides that encryption key to the key fob 160, and then provides an identifier of the to-be-enrolled key fob 160 and the associated encryption key to the vehicle 102. In embodiments, the key fob identifiers and encryption keys for the new to-be-enrolled keys may then be periodically provided to vehicle 102 using a secure communication process with the secure server during, for example, a routine system update periodically performed by the vehicle 102, each time vehicle 102 is turned on, IDSs and keys pushed to the vehicle 102 in response to the request to give a to-be-enrolled key fob access to the car, etc. Furthermore, the communications with the secure server may also be used to un-enroll one or more key fobs (e.g., blacklist key fob IDs, delete key fob encryption keys, etc.). Therefore, great flexibility to enroll multiple keys with the same vehicle, enrolling a single key with multiple vehicles, using existing key fobs for multiple purposes (e.g., same key fob can authenticate a user to a personal and work vehicle), setting conditions on key fob usage (e.g., geographical boundaries, time limitations, validity periods), etc. is provided using the techniques discussed herein.

In embodiments, the key fob encryption keys and vehicle encryption keys exchanged during enrollment and/or for to-be-enrolled key fobs (e.g., key fob 160) may be maintained in hardened or secure storage and/or computing modules on vehicle 102 and key fob 160. Such secured storage and/or computing modules ensures that the keys are protected from physical tampering (e.g., physically accessing memory) and/or logical tampering (e.g., hacking memory or snooping transmissions) with the sensitive data stored by the vehicle 102 and/or key fob 160. For example, the vehicle 102 and/or key fob 160 may include physically and/or logically isolated processing and/or storage resources that ensure the processes performed by the vehicle 102 and key fob 160 are free from attacks, that sensitive information (e.g., encryption keys, identifiers, etc.) is maintained in a secure location within vehicle 102 and/or key fob 160, and that the processes using the sensitive information are performed within the logical and/or physical isolation of a hardware security module. The hardware security module of the vehicle 102 and/or key fob 160, when present, may reside in the main processing unit of vehicle 102 (e.g., the VCU 106) and/or the key fob 160, as well as other processing units of vehicle 102 and key fob 160 that are capable of providing secure processing and memory resources. By employing hardware security safeguards by the vehicle 102 and/or key fob 160, tampering based attacks, such as attempts to physically or logically access a memory storing encryption keys, identifiers, etc. is prevented.

In embodiments, a request to enroll a new key fob, such as key fob 160 is received via user interface 112. The request may be initiated by a dealership, factory, or by a user/owner of vehicle 102. Furthermore, in embodiments, the request occurs after the vehicle 102 has received an identifier and an encryption key associated with to-be-enrolled key fob 160 (e.g., via a secure communication process with a trusted server or via a trusted hardware connection to vehicle) discussed in greater detail above. The request for enrollment could include the user entering a username and/or password that identifies and/or authenticates the user to the vehicle, authenticating an existing key fob enrolled with vehicle 102 and associated with the user, etc. Furthermore, the request may include that an already enrolled key fob/user of the vehicle 102 be present as a pre-authentication to the new key fob being enrolled (e.g., to prevent an unknown or untrusted user from enrolling a key fob). Furthermore, additional security checks, as discussed in greater detail below, such as the key fob encryption manager 170 of key fob 160 determining from signal measurements whether the key fob is located within vehicle 102 (e.g., at location 180-1), vehicle encryption manager 120 of vehicle 102 determining whether key fob 160 has been placed in a requested location within vehicle (e.g., location 180-2), whether the key fob encryption manager 170 of key fob 160 is able to perform encryption operations using an encryption key of the vehicle using the encryption protocol supported by the vehicle encryption manager 120, etc. Such operations are applied during the enrollment process to ensure integrity, functional capabilities, and trust in the key fob (e.g., key fob 160) being enrolled for use with vehicle 102.

Once key fob 160 is successfully enrolled with vehicle 102, a user of key fob 160 may gain access to and operate the vehicle 102 following an authentication process, which is discussed in greater detail below in FIG. 3. In embodiments, each wireless communication exchanged between vehicle 102 and key fob 160 for authentication purposes is encrypted using the encryption key of the vehicle 102. In embodiments, a symmetric encryption method that provides both confidentiality and authentication, such as CCM mode for AES 128, GCM mode of AES 128, etc., is utilized for the exchange of data during key fob 160 authentication. Furthermore, consistent with the discussion herein, additional security and encryption techniques may be used, such as using MAC tags to ensure authenticity of message content, using nonce data prepended to encrypted messages to ensure message freshness, etc.

Furthermore, one or more blocks of random data may be added to each data packet prior to encryption by both of the vehicle encryption manager 120 of vehicle 102 and the key fob encryption manager 170 of key fob 160 prior to encryption and wireless transmission. In one embodiment, the random data is a timestamp, although any randomly chosen data may be used consistent with the discussion herein. By including the random data in data packets that are then encrypted, the authentication process ensures that no two data packets exchanged during authentication and use of the key fob 160 are the same. This enhances user privacy by preventing unwanted vehicle tracking by entities monitoring exchanged data packets (e.g., other vehicles, wireless network access points, etc.).

In embodiments, the exchange of encrypted messages using the vehicle's encryption key ensures that both the key fob 160 and vehicle 102 are authorized to use the key. In embodiments, and as will be discussed in greater detail below, one or more data elements in the exchanged wireless communications can be encrypted by the key fob 160 using its own encryption key. By using key fob 160 encrypted data and key fob identifiers, the vehicle is able to identify a specific key fob, verify that the key fob is using the correct key, and has the ability to exchange messages using the vehicle's 102 encryption key. This collection of factors provides a strong authentication technique for granting operational access to the vehicle 102, while at the same time improving privacy by preventing static beacon tracking, as discussed herein.

Although only a single key fob and vehicle are illustrated in FIG. 1, any number of key fobs may be enrolled with vehicle 102. For example, each member of a family may have a key fob paired with vehicle 102, certain employees of an organization with permission to operate vehicle 102 may have their key fobs enrolled with vehicle, etc. Similarly, key fob 160 may be enrolled with any number of vehicles. For example, a user may enroll their key fob with several family vehicles, one or more work vehicles, a rental vehicle, etc.

Figure 2:
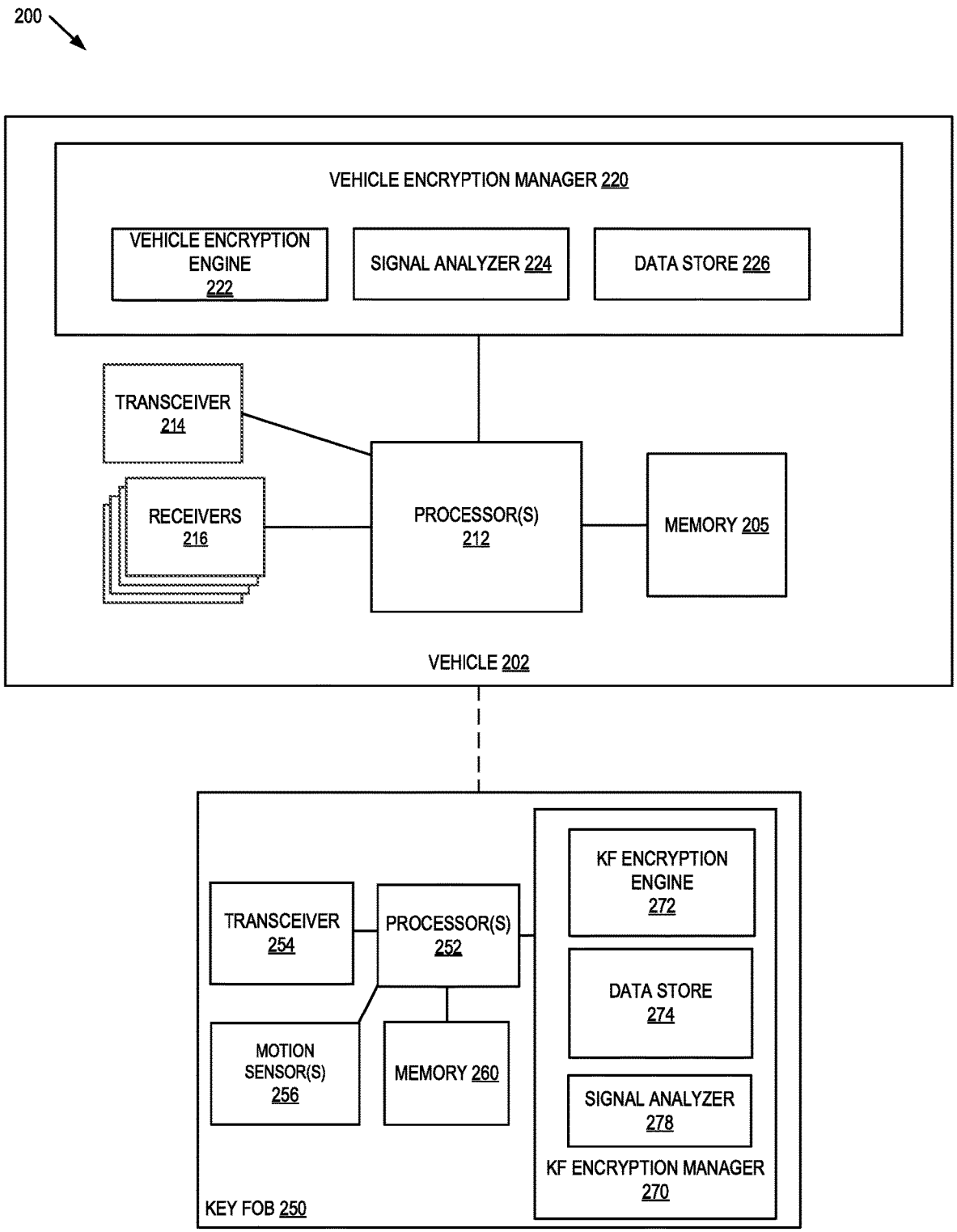
FIG. 2 is block diagram of one embodiment of a system including a vehicle and a key fob in communication with one another.

FIG. 2 is block diagram of one embodiment of a system 200 including a vehicle 202 and a key fob 250. Vehicle 202 and key fob 250 provide additional details for vehicle 102 and a key fob 160 discussed above in FIG. 1.

In one embodiment, vehicle 202 is a system, which may include one or more processor(s) 212, a memory 205, a transceiver 214, and a plurality of receivers 216. It should be appreciated that vehicle 202 may also include, although not illustrated, a user and/or hardware interface, vehicle controls, one or more power device(s) (e.g., vehicle battery, drive control system, one or more vehicle systems (e.g., VCUs, components, positioning systems, etc.) etc.), a propulsion system (e.g. an electric, gasoline, etc. powered motor), a steering system, a braking system, as well as other components typically associated with vehicles. It is to be understood that vehicle 202 may include a separate network interface (not shown) that may be capable of communicatively coupling vehicle 202 to any number of wireless subsystems (e.g., Bluetooth, WiFi, Cellular, or other networks), internal vehicle communication networks (e.g., a CAN bus, an Ethernet network, a wireless network, etc.) to transmit and receive data streams through one or more communication links. In embodiments, transceiver 214 and/or one or more receivers 216 may provide the network interface to various wireless subsystems.

In one embodiment, key fob 250 is also a wireless device, which may include one or more processor(s) 252, a memory 260, one or more motion sensor(s) 256 (e.g., one or more of an accelerometer, gyroscope, inertial measurement unit, etc.), and a transceiver 254. In embodiments, transceiver 254 is a personal area network transceiver, such as a Bluetooth, BLE, Zigbee, or other personal area network transceiver. It should be appreciated that key fob 250 may also include, although not illustrated, a user interface (e.g., keyboard, touch-screen, or similar devices), a power device (e.g., a battery), a display screen (e.g., an LCD display), as well as other components typically associated with wireless devices. As discussed above, key fob 250 may be implemented in a purpose built device, or utilize the hardware and processing resources of a mobile telephone, smart watch, etc.

In embodiments, the memories (e.g., memory 205 and memory 260) of vehicle 202 and key fob 250 may be coupled to processor(s) to store instructions for execution by the processors, such as processor (s) 212 and processors 252. In some embodiments, the memory is non-transitory, and may store one or more processing modules. In one embodiment, memory 205 of vehicle 202 may store one or more processing modules of a vehicle encryption manager 220, such as a vehicle (MV) encryption engine 222, a signal analyzer 224, and a data store 226, to implement embodiments described herein. Furthermore, memory 260 of key fob 250 may also include a key fob (KF) encryption manager 270, including a KF encryption engine 272, data store 274, and signal analyzer 278.

It should be appreciated that the embodiments as will be hereinafter described may be implemented through the execution of instructions, for example as stored in memory or other element, by processor(s) and/or other circuitry of vehicle 202 and key fob 250. Particularly, circuitry of vehicle 202 and key fob 250, including but not limited to processor(s) 212 and processor(s) 252 may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor(s) 212 and processor(s) 252, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, vehicle 202 includes vehicle encryption manager 220 to perform key fob enrollment and key fob authentication processes, as discussed in greater detail below in FIGS. 3 and 4. To this end, vehicle encryption manager 220 utilizes vehicle encryption engine 222 to encrypt and decrypt messages that have been wirelessly exchanged with key fob 250 during the key fob enrollment and key fob authentication processes. In embodiments, while vehicle encryption manager 220 is responsible for generating message contents (e.g., constructing messages using vehicle identifiers, key fob identifiers, encryption keys, etc. stored in data store 226, as well as generating random data for message contents such as time stamps), vehicle encryption engine 222 is responsible for performing encryption options to encrypt and decrypt exchanged messages using a secure encryption protocol, such as messages encrypted using AES, CCM mode of AES, GCM mode of AES, etc. The various encryption operations performed by vehicle encryption engine 222 ensure that sensitive data that is exchanged wirelessly between vehicle 202 and key fob 250 is secure from inadvertent disclosure or discovery by nefarious actors that monitor or capture wireless communications exchanged between vehicle 202 and key fob 250. As will be discussed in greater detail below, what information is encrypted, the ordering of exchanged messages, and the contents of the exchanged messages, ensures secure enrollment and authentication of the key fob 250 to vehicle 202.

In embodiments, signal analyzer 222 is also used by vehicle encryption manager 220 to increase security of both enrollment and authentication processes. In embodiments, signal analyzer 224 collects signal strength measurements (e.g., received signal strength indicator (RSSI) measurements) from receivers 216 for messages originating from key fob 260 during enrollment and authentication. In embodiments, receivers 216 include at least four receivers placed at known locations within vehicle 202. Then based on the known locations and/or relative locations of the receivers, as well as the RSSI measurements collected by each receiver, signal analyzer 224 performs a positioning operation to determine a location of the signal source (e.g., key fob 250) relative to the vehicle 202. The positioning operation performed by signal analyzer 224 can include performing triangulation, localization, etc. during key fob enrollment and key fob authentication, as discussed in greater detail below in FIGS. 3 and 4, to estimate a more precise location of the key fob 250 within the vehicle. By determining a location of an enrolled key fob within a vehicle and/or a new key fob seeking enrollment to a vehicle, the techniques discussed herein may prevent remote attacks seeking to gain unauthorized access to a vehicle, such as nefarious use of signal grabbers, replay attack devices, etc.

Data store 226 is used by vehicle encryption manager 220 to securely store a unique vehicle identifier of vehicle 202, one or more unique key fob identifiers of key fobs (e.g., key fob 250) that have been successfully enrolled according to the process of FIG. 4 discussed below, and one or more encryption keys including an encryption key of the vehicle (e.g. an AES 128 key) and key fob encryption keys associated with identified and enrolled key fobs. In embodiments, memory 205 or another memory of vehicle 202 may provide a secure/tamper resistant storage for data store 226, such as a storage within a hardware security module of vehicle 202.

In one embodiment, KF encryption engine 272 of the key fob 250 performs complementary functions to those performed by the vehicle encryption engine 222 during enrollment and authentication processes. That is, KF encryption engine 272 is used to encrypt and decrypt messages that have been wirelessly exchanged with vehicle 202 during the key fob enrollment and key fob authentication processes. Thus, KF encryption engine 272 is configured to utilize the same encryption protocol, such as AES, CCM mode of AES, GCM mode of AES, etc., when participating in the exchange of wireless messages during the enrollment and authentication processes discussed herein.

Signal analyzer 278 of KF encryption manager 270 is used to collect signal strength measurements for wireless messages originating from vehicle 250. In one embodiment, signal analyzer 278 utilizes a receiver of transceiver 254 to collect the measurement. In embodiments, signal analyzer 278 utilizes the signal strength measurement to estimate a distance from the signal source (e.g., transceiver 214), in order to determine whether key fob 250 is located within vehicle 202. As discussed below, key fob 250 utilizes this determination when determining whether to proceed with an enrollment request issued by vehicle 202.

In embodiments, data store 274 of KF encryption manager 270 enables storage of data used during key fob 250 enrollment and authentication with vehicle 202, such as unique vehicle identifiers for vehicles in which key fob 250 has been successful enrolled, vehicle encryption keys associated with the enrolled vehicles, and a unique key fob identifier. In embodiments, memory 260 or another memory of key fob 250 may provide secure/tamper resistant storage for data store 274.

Figure 3:
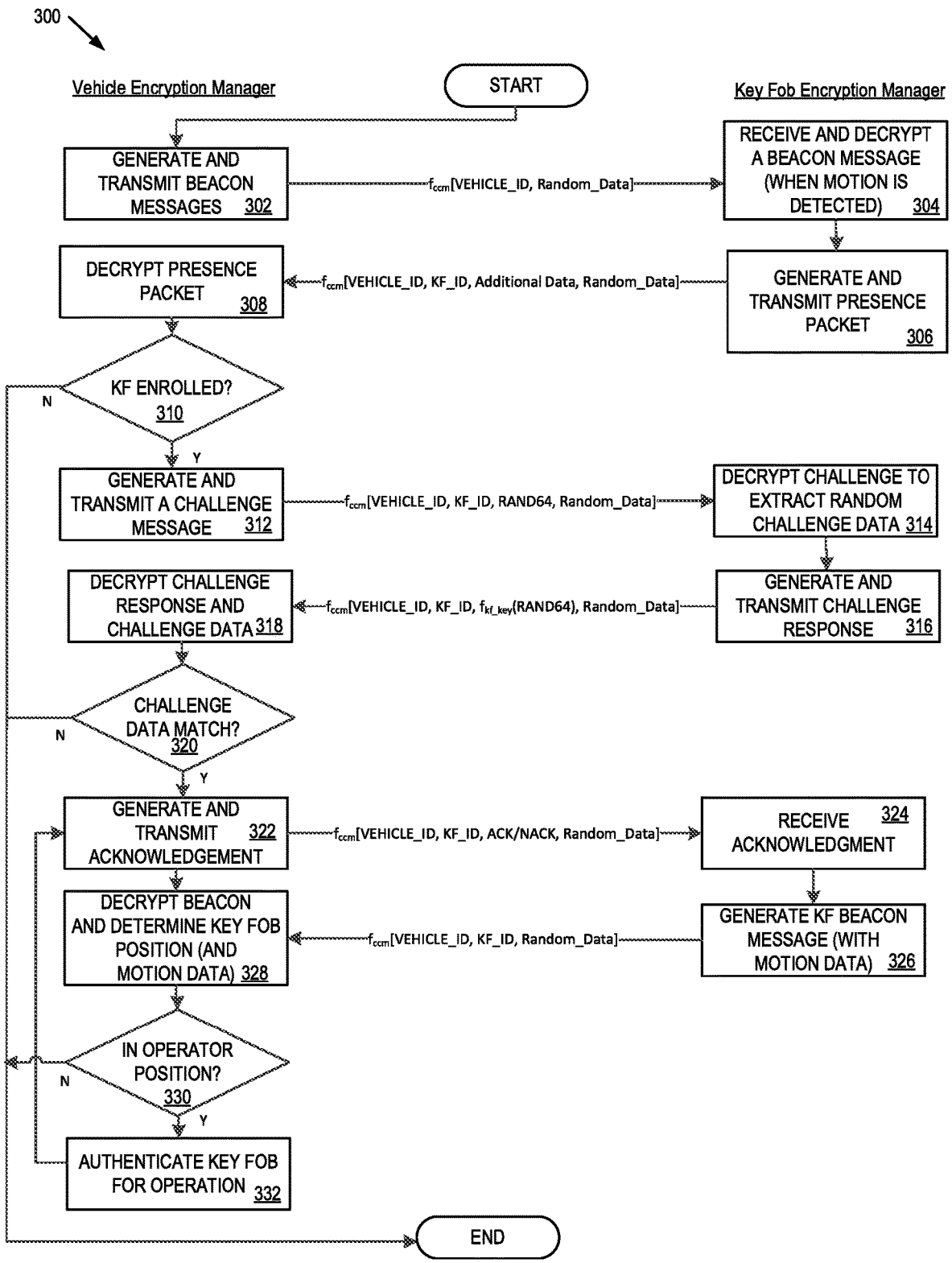
FIG. 3 is a flow diagram of one embodiment of a method for performing authentication of a key fob.

FIG. 3 is a flow diagram of one embodiment of a method 300 for performing authentication of a key fob. The method 300 is performed by processing logic that may comprise hardware (circuitry, dedicated logic, etc.), software (such as is run on a general purpose computer system or a dedicated machine), firmware, or a combination. In one embodiment, the method 300 is performed by a vehicle encryption manager (e.g., vehicle encryption manager 120 or 220 of vehicle 102 or 202) and a key fob encryption manager (e.g., KF encryption manager 170 or 270 of key fob 160 or 250).

Referring to FIG. 3, processing logic begins by vehicle encryption manager generating and transmitting one or more beacon messages (processing block 302). In embodiments, the generated message includes at least an identifier of the vehicle and random data (e.g. a time stamp or other data to randomize message contents as discussed above). Furthermore, the message is encrypted using a secure and publicly vetted encryption protocol, such as AES 128, CCM mode of AES 128, GCM mode of AES 128, etc. In one embodiment, an encryption key of the vehicle is used to encrypt the generated message. In embodiments, the beacon messages are broadcast periodically, such as every 10 second, on a plurality of personal area network channels (e.g. channels associated with and assigned to enrolled key fobs).

Processing logic of the key fob encryption manager receives and decrypts a beacon message (processing block 304). It is assumed in the process performed by FIG. 3 that the key fob encryption manager is executed by a key fob that has been successfully enrolled with the vehicle executing the vehicle encryption engine, so that the key fob encryption manager has access to the encryption key of the vehicle that generated the beacon message for decryption purposes. In one embodiment, processing logic optionally determines if motion is detected, for example using key fob's motion sensor(s) (e.g., motion sensor(s) 256) at processing block 304. In one embodiment, the motion is motion in general (e.g., the detected existence of motion). The existence of motion is indicative of the key fob being used, as opposed to no detected motion indicating that the key fob is not in use. In embodiments, the detection of motion improves battery performance of the key fob, but limiting the authentication processes discussed herein to when the key fob is likely being used.

Once the beacon message is validated (e.g., by the key fob encryption manager successfully decrypting the message and recognizing the vehicle identifier in the message), and optionally when motion of the key fob is detected, processing logic of the key fob encryption manager generates and transmits a presence packet (processing block 306). The presence packet is generated to include at least the vehicle identifier, the key fob identifier, additional data if any, and random data. The presence packet is then encrypted using the secure and publicly vetted encryption protocol, such as CCM or GCM mode of AES 128, and using the encryption key of the vehicle. The remainder of the messages exchanged between the key fob encryption manager and the vehicle encryption manager utilize the vehicle's encryption key and the secure and publicly vetted encryption protocol.

In one embodiment, the detection of motion is made by processing logic at processing block 306 before responding to the beacon message to control when the key fob generates a response to the vehicle. That is, for example, a stationary key fob may not respond to the vehicle because lack of motion may be indicative of non-use by a user of a key fob (e.g., a user's key stored in their garage within range of the car, a key sitting on a desk, etc.). Conversely, a user motion (e.g., existence of movement of the key fob) may indicate a user's desire to use they key fob for accessing and/or operating the vehicle. When motion is detected, key fob may respond to the beacon message with the presence packet, as discussed herein.

Processing logic of the vehicle encryption engine receives the presence packet and decrypts the presence packet using the encryption key of the vehicle (processing block 308). In one embodiment, the presence packet may include the motion data of the key fob, which may be indicative of use of the key fob by the user. Once decrypted, the vehicle encryption engine is able to determine, based on the key fob identifier in the presence packet whether the key fob is an enrolled key fob (processing block 310). When the key fob is not associated with an enrolled key fob identifier, the process ends and optionally a failure message is sent to the key fob. However, when the key fob is associated with an enrolled key fob identifier, processing logic of the vehicle encryption engine generates and transmits a challenge message (processing block 312). In one embodiment, the challenge message includes the vehicle's identifier, the key fob's identifier, random challenge data (e.g., a random 8, 16, 32, 64, etc. bit number), and random data (e.g., a timestamp), and is encrypted using the vehicle's encryption key.

Processing logic of the key fob encryption engine receives and decrypts the challenge to extract the random challenge data (processing block 314). A challenge response may then be generated using the extracted challenge data and transmitted to the vehicle encryption engine (processing block 316). The challenge response is generated to include at least the vehicle identifier, the key fob identifier, and an encrypted version of the challenge data encrypted using the key fob's encryption key, as well as random data (e.g., a timestamp). The message, like the other messages, is encrypted using the encryption key of the vehicle.

Processing logic of the vehicle encryption engine receives the challenge response and decrypts the message using the vehicle's encryption key, and decrypts the encrypted challenge data using a key fob encryption key based on the key fob identifier in the message (processing block 318). If the decrypted version of the challenge data, which the key fob purports to be the original challenge data, does not match the random challenge data generated by the vehicle encryption engine (processing block 320), the key fob fails to be authenticated and the process ends. However, when there is a match, and the decrypted version of the challenge data transmitted by key fob encryption manager matches the randomly generated challenge data (processing block 320), then the vehicle encryption engine is able to determine that the key fob is enrolled based on the key fob identifier, is using the correct key fob key of the enrolled/identified key fob, the key fob has the vehicle's encryption key, and the key fob is able to use the correct encryption protocol for exchanging messages with the vehicle encryption engine of the vehicle. As a result, the key fob is authenticated to the vehicle.

In embodiments, processing logic of the vehicle encryption engine generates and transmits an acknowledgement message (processing block 322). In embodiments, the acknowledgement message includes at least the vehicle identifier, key fob identifier, an acknowledgement (or optionally a non-acknowledgement), and random data (e.g., a time stamp). The processing logic of the key fob encryption manager receives the acknowledgment message and decrypts it using the vehicle's encryption key (processing block 324), and then generates a key fob beacon message (processing block 326). The key fob beacon message is generated to include at least the vehicle identifier, key fob identifier, and random data (e.g. a timestamp). The key fob beacon message may further include motion data indicative of existence of motion. As discussed herein, movement of the key fob may be used to determine when a key fob is actively being used by a user to access and/or operate a vehicle.

Processing logic of the vehicle encryption engine decrypts the beacon message and determines a position of the key fob relative to, or within, the vehicle (processing block 328). As discussed herein, processing logic of the vehicle encryption engine utilizes signal strength measurements (e.g., RSSI measurements) collected by a plurality of vehicle receivers for the received beacon message (e.g., generated at processing block 326). Processing logic is able to use the plurality of signal strength measurements to determine a position of the key fob relative to, or within, the vehicle. In one embodiment, the determined position is used by processing logic to determine whether the key fob is located within a threshold distance of a vehicle operator position (e.g., proximate to a driver's seat of the vehicle) (processing block 330). In one embodiment, the position determination provides a further level of authentication before the user of a key fob is able to operate a vehicle. When processing logic determines that the key fob is not in an operator position, the process ends. In another embodiment, when processing logic determines that the key fob is not in an operator position, the relative position of the key fob to the vehicle may be used to perform other operations (e.g., unlock command applied to a door to which key fob is currently located).

However, when processing logic determines that the key fob is in an operator position, processing logic authenticates the key for operation of the vehicle (processing block 332) and returns to processing block 322 so that an acknowledgement message can be generated and transmitted by the vehicle encryption engine.

In embodiments, by returning to processing block 322, processing logic is able to continue to monitor the position of the key fob for determining whether the vehicle should remain in an operational state (e.g., transitioning the vehicle from on to off, generating a warning, locking doors, etc. when the key fob leaves the operator position).

In the embodiments of FIG. 3 discussed above, a secure technique for authenticating a key fobs identity, enrollment status, command execution, and suitability for vehicle operation are determined. Furthermore, the data exchanged for each authentication operation and communication is encrypted to ensure data security. Finally, random data is added to each message exchanged between the key fob and vehicle to prevent tracking that can occur when messages with static content is exchanged.

Prior to the authentication process discussed above in FIG. 3, a key fob is enrolled with a vehicle (e.g. to exchange identifiers, keys, etc.). Furthermore, prior to the enrollment process of FIG. 4, vehicle may receive key fob identifiers and associated encryption keys (e.g., securely from a secure server or from another trusted source) used in the process discussed below. FIG. 4 is a flow diagram of one embodiment of a method 400 for enrolling a key fob with a vehicle. The method 400 is performed by processing logic that may comprise hardware (circuitry, dedicated logic, etc.), software (such as is run on a general purpose computer system or a dedicated machine), firmware, or a combination. In one embodiment, the method 400 is performed by a vehicle encryption manager (e.g., vehicle encryption manager 120 or 220 of vehicle 102 or 202) and a key fob encryption manager (e.g., KF encryption manager 170 or 270 of key fob 160 or 250).

Figure 4:
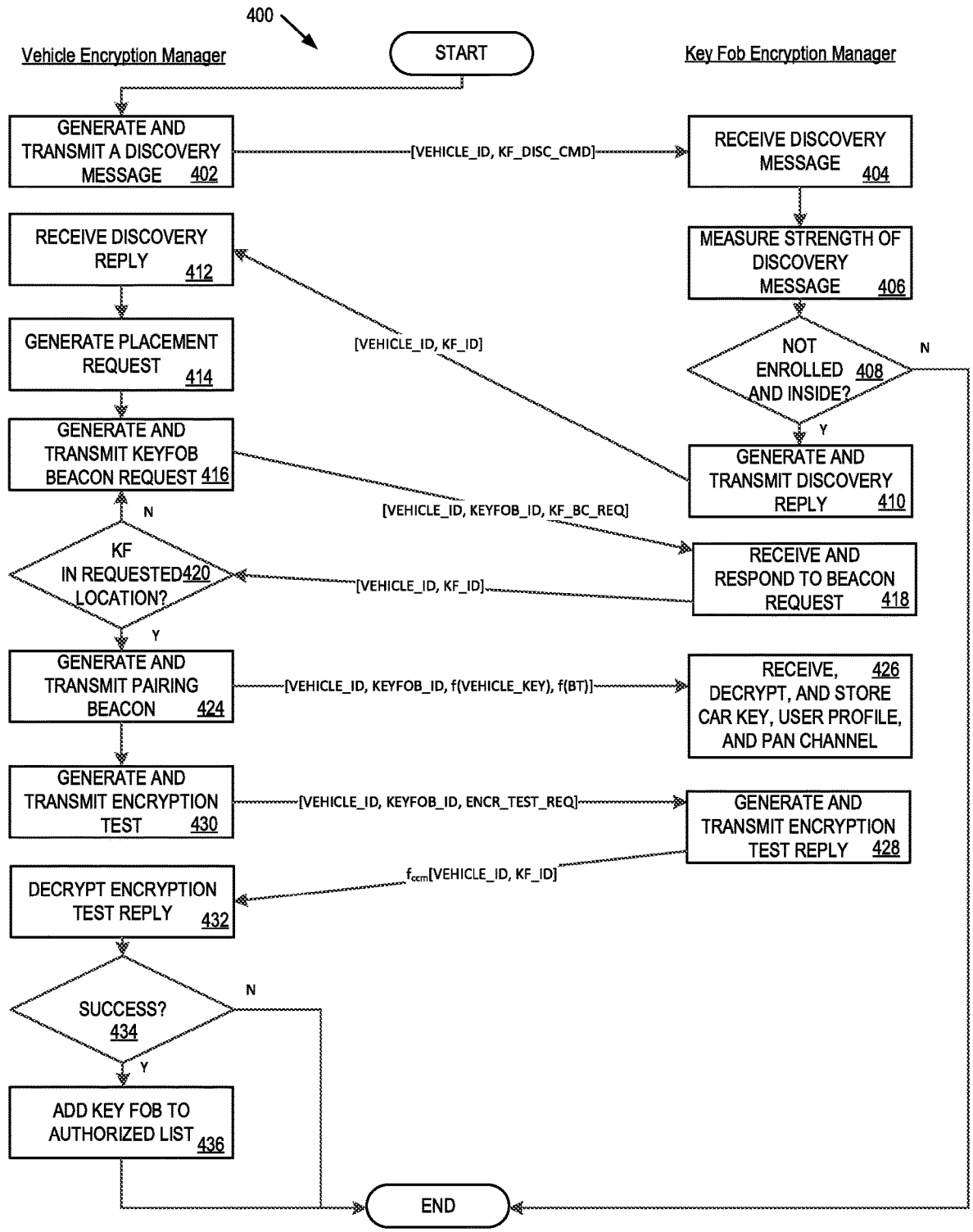
FIG. 4 is a flow diagram of one embodiment of a method for enrolling a key fob with a vehicle.

Referring to FIG. 4, processing logic begins by vehicle encryption manager generating and transmitting a discovery messages (processing block 402). In embodiments, communications between the vehicle encryption manager and the key fob encryption manager are not encrypted for enrollment, except for one or more message fields/messages discussed below. Furthermore, in one embodiment, the discovery message includes at least an identifier of the vehicle and a key fob discovery command. A reserved personal area network channel may be utilized by the vehicle encryption manager to transmit the discovery message during key fob enrollment. In one embodiment, the discovery message can be initiated in response to a user (e.g., a vehicle owner, service work, or factory technician) seeking to pair a new key fob to a vehicle after successfully authenticating a previously enrolled key. For example, a user may authenticate himself to the vehicle using the process discussed above in FIG. 3, and select (e.g. in a graphical user interface of the vehicle) an option to pair a new key fob with the vehicle. In one embodiment, because the key fob pairing occurs under controlled circumstances (e.g., in a factory, at a dealership, by an owner with an enrolled key), the key fob encryption key for the new key fob that is sought to be paired is known, created, and/or transferred to the vehicle encryption engine (e.g., transferred securely via a back end communications process, transferred directly (e.g., via a memory card, USB stick, etc.), created randomly within the process, etc.) (as discussed in greater detail above).

Processing logic of the key fob encryption manager receives the discovery message and measures a signal strength of the discovery message (processing block 406). In one embodiment, a transceiver of the key fob that received the discovery message is used to perform the signal strength measurement. Processing logic of the key fob encryption manager then determines whether the key fob is enrolled and inside the vehicle that transmitted the discovery message (processing block 408). In embodiments, processing logic of the key fob encryption manager accesses a key fob data store to determine whether the vehicle identified in the discovery message is associated with a vehicle identifier for which the key fob has already completed enrollment. If so, the process ends. Processing logic of the key fob encryption manager also uses the signal strength measurement to estimate a distance between the key fob an the transmitter of the vehicle that transmitted the discovery message. When this distance satisfies a threshold distance, processing logic of the key fob encryption manager is able to determine the key fob is outside of the vehicle, and again the process ends.

However, when processing logic of the key fob encryption manager determines that the key fob is not already paired with the vehicle, and the key fob is located within the vehicle, a discovery reply is generated and transmitted by the key fob encryption manager (processing block 410). The contents of the discovery reply message include, at least, the identifier of the vehicle and an identifier of the key fob.

Processing logic of the vehicle encryption manager receives the discovery reply (processing block 412) and generates a placement request (processing block 414). In one embodiment, the placement request includes a random selection of a location within vehicle that the key fob should be physically placed for the duration of the pairing process. Furthermore, the placement request may be communicated to a user seeking the pairing of the key fob via a generated display on a user interface (e.g., user interface 112 of FIG. 1).

Processing logic of the vehicle encryption manager then generates and transmits a key fob beacon request message (processing block 416). In an embodiment, the key fob beacon request message includes at least the identifier of the vehicle, identifier of the key fob, and a key fob beacon request command. Processing logic of the key fob encryption manager receives the request and responds with a beacon reply (processing block 418), which include at least the identifier of the vehicle and the identifier of the key fob. Processing logic of the vehicle encryption manager utilizes the reply of the key fob encryption manager to determine whether the key fob has been placed in the requested location (processing block 420). In embodiments, the location of the key fob can be determined utilizing a plurality of signal strength measurements collected by a plurality of receivers of the vehicle. When the key fob is not in the requested placement location, processing logic of the vehicle encryption manager returns to processing block 416 to generate and transmit another key fob beacon request message. Processing logic of the vehicle encryption manager will therefore continue to transmit the beacon request messages until the key fob is placed in the requested position or the pairing process is terminated (e.g., by the vehicle, a user, the key fob, due to inactivity, etc.).

When processing logic of the vehicle encryption manager determines that the key fob has been placed in the requested location within the vehicle, which ensures an intent of a user seeking to pair the key fob with the vehicle, processing logic of the vehicle encryption manager generates and transmits a pairing beacon (processing block 424). The pairing beacon message includes, at least, the identifiers of the vehicle and key fob, an encrypted version of the vehicle's encryption key, and an encrypted version of a personal area network assignment for authorization requests (e.g., as discussed above in FIG. 3). In embodiments, the key fob's encryption key (e.g., received by the vehicle as a to-be-enrolled key fob) is utilized to encrypt the vehicle's encryption key and the Bluetooth channel. Processing logic of the key fob encryption manager receives the pairing beacon, and uses its encryption key to decrypt and store the received information for future authorization operations (processing block 426).

Processing logic of the vehicle encryption manager then generates and transmits an encryption test message (processing block 430). The encryption test message is used by processing logic of the vehicle encryption manager to ensure that the key fob encryption manger has successfully decrypted the vehicle's encryption key, and has the capabilities to perform the required encryption techniques used during key fob authentication (e.g., CCM or GCM mode of AES 128). In one embodiment, the encryption test message includes a command that instructs the key fob encryption manager to generated an encrypted response using the encryption key of the vehicle using the encryption techniques used during key fob authentication. In one embodiment, processing logic of the key fob encryption manager generates and transmits an encryption test reply (processing block 428) as instructed, which includes generating a message including at least the vehicle and key fob identifiers and encrypting the reply using the vehicle's encryption key with the specified encryption technique.

Processing logic of the vehicle encryption manager receives and decrypts the encryption test reply (processing block 432). When processing logic of the vehicle encryption manager is able to successfully decrypt the reply (e.g., comparison of decrypted version of the vehicle and key fob identifiers with the identifiers known to the vehicle encryption manager) (processing block 434), the key fob is added to an authorized list of key fobs (processing block 436). However, when processing logic of the vehicle encryption manager is not able to successfully decrypt the reply (processing block 434), the paring process ends After being added to the list, the key fob is able to participate in an authentication process for enabling operation of the vehicle (e.g., unlocking, opening doors, starting a vehicle motor, navigating the vehicle, etc.), as discussed above in FIG. 3. Furthermore, a user of the vehicle that already has an enrolled key fob may leverage their established trust with the vehicle to enroll a new key fob, revoke access to an existing key fob, limit vehicle usage for existing registered key fob(s), etc. Furthermore, these operations that can be performed by a user may be performed outside of the context of a dealership, service center, or factory, thereby providing the user great flexibility in what wireless devices (e.g., purpose built key fobs, mobile telephones, wearable devices, smart watches, etc.) can be used as key fobs to access and operate the vehicle, so long as the wireless devices have sufficient processing and memory resources to perform the operations discussed herein. Additionally, the authorized list including key fob IDs of successfully reenrolled key fobs can be edited and/or key fob security keys deleted, for example, in response to a user request (e.g., to remove or adjust a key fob's authorizations with respect to a vehicle, in response to a security issue (e.g., compromised encryption key storage, stolen key fob, etc.) to prevent a key fob from accessing or operating a vehicle, as well as in response to other circumstances (e.g. to enforce time limits, geographical boundaries, etc. with respect to identified key fobs), to further prevent unwanted and/or unauthorized operation of the vehicle.

Those of skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the methods, systems, and apparatus of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for authentication of a first wireless device by a vehicle, the method comprising:
    generating a wireless message that comprises an identifier of the vehicle, the wireless message is encrypted by the vehicle with an encryption key of the vehicle, and the wireless message comprises first random data generated by the vehicle for the wireless message, the first random data and the identifier of the vehicle added to the wireless message prior to being encrypted, and new first random data generated for each new wireless message generated by the vehicle;
    receiving a wireless message response from the first wireless device that comprises the identifier of the vehicle and an identifier of the first wireless device, the wireless message response generated by the first wireless device after decrypting the wireless message using the encryption key of the vehicle and recognizing the vehicle identifier in the decrypted wireless message, the wireless message response encrypted by the first wireless device with the encryption key of the vehicle, and the wireless message response comprises second random data generated by the first wireless device for the wireless response message, the second random data, identifier of the vehicle, and identifier of the first wireless device added to the wireless message response prior to being encrypted, and new second random data generated for each new wireless message response generated by the first wireless device;
    decrypting the wireless message response from the first wireless device using the encryption key of the vehicle; and
    performing an authentication process to authenticate the first wireless device to the vehicle when the identifier of the first wireless device in the decrypted wireless message response matches an identifier of a wireless device enrolled with the vehicle.

2. The method of claim 1, wherein the vehicle and the first wireless device perform symmetric-key encryption that uses the encryption key of the vehicle for encrypting and decrypting the wireless message, the wireless message response, and one or more wireless messages exchanged between the vehicle and the first wireless device during the authentication process.

3. The method of claim 1, wherein the first random data generated by the vehicle is a first time stamp corresponding to a first time associated with the wireless message and the second random data generated by the first wireless device arois a second time stamp corresponding to a second time associated with the wireless message response.

4. The method of claim 1, wherein the wireless message response is generated by the first wireless device in response to the first wireless device detecting a motion of the first wireless device.

5. The method of claim 1, wherein performing the authentication process to authenticate the first wireless device to the vehicle, further comprises:
    generating a challenge from the vehicle for authentication of the first wireless device to the vehicle, the first wireless device is to encrypt challenge data from the generated challenge using an encryption key associated with the first wireless device;
    transmitting an encrypted version of the challenge to the first wireless device, wherein the encrypted version of the challenge is generated by the vehicle using the encryption key of the vehicle;

receiving an encrypted response to the challenge from the first wireless device, the encrypted response is purported to be encrypted using the encryption key of the vehicle, and an encrypted version of the challenge data within the encrypted response is purported to be encrypted with an encryption key of the first wireless device;

decrypting the response using the encryption key of the vehicle to obtain a decrypted version of the response;

decrypting encrypted challenge data within the decrypted version of the response using an encryption key associated with the first wireless device to obtain a decrypted version of the challenge data; and authenticating the first wireless device based, at least in part, on a match of the decrypted version of the challenge data with the challenge data in the generated challenge.

6. The method of claim 5, further comprising:

determining a location of the first wireless device based, at least in part, on one or more signal strength measurements performed by signal receivers of the vehicle that received the wireless message response; and generating the challenge when the identifier of the first wireless device is verified and the determined location of the first wireless device indicates that the first wireless device is located within the vehicle.

7. The method of claim 1, further comprising:

authenticating the first wireless device for operation of the vehicle based, at least in part, on a location of the first wireless device within the vehicle.

8. The method of claim 7, further comprising:

measuring a signal strength associated with reception of one or more messages from the first wireless device at each of a plurality of signal receivers of the vehicle;

based on the signal strength measured at each of the plurality of signal receivers, determining a physical position of the first wireless device within the vehicle;

authenticating the first wireless device for operation of the motor when the determined physical position is within a threshold distance of an operator position within the vehicle and the decrypted version of the challenge data matches the challenge data in the generated challenge.

9. The method of claim 1, wherein the vehicle stores an encryption key and a wireless device identifier associated with each wireless device that has been enrolled with the vehicle.

10. The method of claim 1, further comprising:

receiving a request to enroll a second wireless device to the vehicle; and initiating an enrollment of the second wireless device for use of the vehicle after the authentication process to authenticate the first wireless device to the vehicle has been completed.

11. The method of claim 10, further comprising:

discovering that the second wireless device to be enrolled for use of the vehicle is present within the vehicle, wherein the second wireless device transmits an identifier of the second wireless device to the vehicle;

displaying a placement request to a user of the second wireless device, wherein the placement request comprises a location within the vehicle where the user should place the second wireless device;

receiving a wireless beacon response message from the second wireless device, wherein a measured location of the second wireless device is determined from one or more signal strength measurements performed by signal receivers of the vehicle that received the wireless beacon response message; and exchanging one or more encryption keys, including the encryption key of the vehicle, with the second wireless device when the measured location matches the location in the placement request.

12. The method of claim 11, further comprising:

transmitting an encryption test to the second wireless device by the vehicle;

receiving an encrypted response to the encryption test from the second wireless device, the encrypted response is purported to be encrypted with the encryption key of the vehicle;

decrypting the encrypted response to the encryption test; and adding the second wireless device, the identifier of the second wireless device, and an encryption key of the second wireless device when the identifier of the vehicle and the identifier of the second wireless device can be extracted from the decrypted version of the response to the encryption test.

13. The method of claim 11, wherein the location within the vehicle is randomly selected for the placement request from a plurality of different locations within the vehicle.

14. The method of claim 1, wherein the first wireless device is one of a key fob, a mobile telephone, or a smart watch.

15. The method of claim 1, wherein the authentication of the first wireless device by the vehicle is performed within a hardware security module of the vehicle.

16. A non-transitory machine readable storage medium having instructions stored thereon, which when executed by a processing system of a vehicle, causes the processing system to perform one or more operations for authentication of a first wireless device, the one or more operations comprising:

generating a wireless message that comprises an identifier of the vehicle, wherein the wireless message is encrypted by the vehicle with an encryption key of the vehicle, and the wireless message comprises first random data generated by the vehicle for the wireless message, the first random data and the identifier of the vehicle added to the wireless message prior to being encrypted, and new first random data generated for each new wireless message generated by the vehicle;

receiving a wireless message response from the first wireless device that comprises the identifier of the vehicle and an identifier of the first wireless device, the wireless message response generated by the first wireless device after decrypting the wireless message using the encryption key of the vehicle and recognizing the vehicle identifier in the decrypted wireless message, the wireless message response encrypted by the first wireless device with the encryption key of the vehicle, and the wireless message response comprises second random data generated by the first wireless device for the wireless response message, the second random data, identifier of the vehicle, and identifier of the first wireless device added to the wireless message response prior to being encrypted, and new second random data generated for each new wireless message response generated by the first wireless device;

decrypting the wireless message response from the first wireless device using the encryption key of the vehicle; and performing an authentication process to authenticate the first wireless device to the vehicle when the identifier of the first wireless device in the decrypted wireless message response matches an identifier of a wireless device enrolled with the vehicle.

17. The non-transitory machine readable medium of claim 16, wherein the vehicle and the first wireless device perform symmetric-key encryption that uses the encryption key of the vehicle for encrypting and decrypting the wireless message, the wireless message response, and one or more wireless messages exchanged between the vehicle and the first wireless device during the authentication process.

18. The non-transitory machine readable medium of claim 16, further comprising:
receiving a request to enroll a second wireless device to the vehicle; and
initiating an enrollment of the second wireless device for use of the vehicle after the authentication process to authenticate the first wireless device to the vehicle has been completed.

19. The non-transitory machine readable medium of claim 16, wherein the first wireless device is one of a key fob, a mobile telephone, or a smart watch.

20. A system, comprising:
a transmitter for transmitting wireless messages over a personal area network of a vehicle;
a plurality of receivers for receiving wireless messages over the personal area network of the vehicle; and
a processor communicably coupled with the transmitter and the plurality of receivers to:
generate a wireless message that comprises an identifier of the vehicle, the wireless message is encrypted by the vehicle with an encryption key of the vehicle, and the wireless message comprises first random data generated by the vehicle for the wireless message, the first random data and the identifier of the vehicle added to the wireless message prior to being encrypted, and new first random data generated for each new wireless message generated by the vehicle,
receive a wireless message response from the first wireless device that comprises the identifier of the vehicle and an identifier of the first wireless device, the wireless message response generated by the first wireless device after decrypting the wireless message using the encryption key of the vehicle and recognizing the vehicle identifier in the decrypted wireless message, the wireless message response encrypted by the first wireless device with the encryption key of the vehicle, and the wireless message response comprises second random data generated by the first wireless device for the wireless response message, the second random data, identifier of the vehicle, and identifier of the first wireless device added to the wireless message response prior to being encrypted, and new second random data generated for each new wireless message response generated by the first wireless device,
decrypt the wireless message response from the first wireless device using the encryption key of the vehicle, and
perform an authentication process to authenticate the first wireless device to the vehicle when the identifier of the first wireless device in the decrypted wireless message response matches an identifier of a wireless device enrolled with the vehicle.

21. The system of claim 20, wherein the vehicle and the first wireless device perform symmetric-key encryption that uses the encryption key of the vehicle for encrypting and decrypting the wireless message, the wireless message response, and one or more wireless messages exchanged between the vehicle and the first wireless device during the authentication process.

22. The system of claim 20, wherein the processor is further configured to:
receive a request to enroll a second wireless device to the vehicle, and
initiate an enrollment of the second wireless device for use of the vehicle after the authentication process to authenticate the first wireless device to the vehicle has been completed.

23. The system of claim 20, wherein the first wireless device is one of a key fob, a mobile telephone, or a smart watch.

* * * * *